No. 823,083. PATENTED JUNE 12, 1906.
W. H. RUSSELL.
ROLLER BEARING.
APPLICATION FILED APR. 27, 1905.
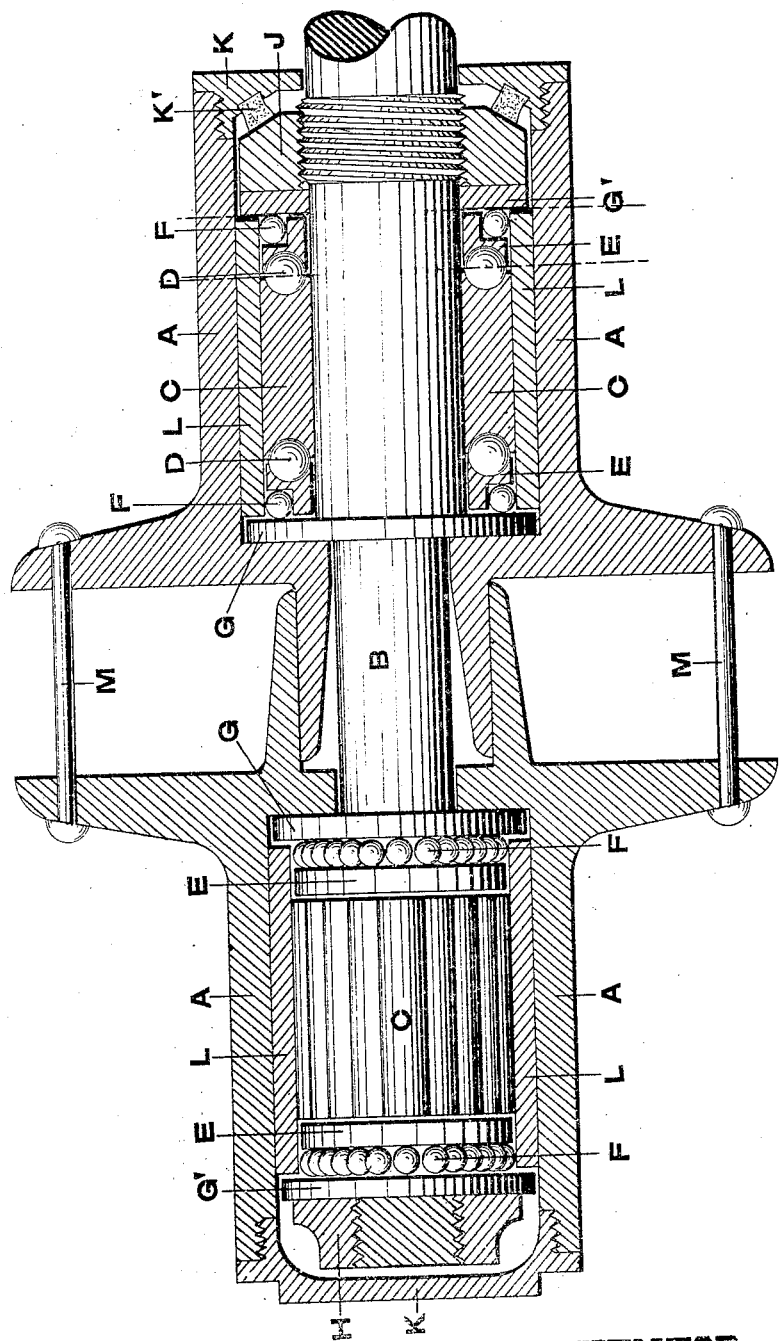
WITNESSES
INVENTOR
WILLIAM H. RUSSELL.

UNITED STATES PATENT OFFICE.

WILLIAM HENDERSON RUSSELL, OF DOUGLASTOWN, CANADA.

ROLLER-BEARING.

No. 823,083.        Specification of Letters Patent.        Patented June 12, 1906.

Application filed April 27, 1905. Serial No. 257,565.

*To all whom it may concern:*

Be it known that I, WILLIAM HENDERSON RUSSELL, of the village of Douglastown, Province of New Brunswick, Dominion of Canada, have invented certain new and useful Improvements in Roller-Bearings, of which the following is a full, clear, and exact description.

My invention relates, broadly, to that class of mechanical devices known as "roller-bearings," and more particularly to those bearings which are used in vehicles.

The object of my device is to reduce to a minimum the end friction present in all former types. The particular construction employed to attain this end will be readily understood upon referring to the following description and annexed drawing, which is a longitudinal sectional view through the center, showing the relative position of all the parts. On the right of this figure the rollers and rings are shown in section to more clearly illustrate the seating of the balls, and on the left the rollers, balls, and rings are shown in elevation.

In the drawing, around the central axle B and parallel to it are placed rollers C in series, the series being a suitable distance apart, as illustrated. Each of these rollers is provided with a hemispherical concave pocket in each end, adapted to receive a ball D. At each end of the series of rollers is a hardened annular ring E, surrounding the axle, but not in contact with it. In the face of the ring adjacent to the rollers are a number of pockets similar to those in the rollers and so disposed that there is a pocket in the rings opposite to the pocket in the end of each roller. These pockets are of such a depth that on the ball being seated in them there is a slight clearance between the rings and the rollers. The rings have annular channels cut on the sides remote from the pockets, in which are placed a plurality of balls F, slightly larger in diameter than the depth of the channel, but smaller than the balls in the ends of the rollers. It is by this means that a clearance is effected between the rings and the adjacent collars G G' and the sleeves L. The collars G G' are placed outside of the rings, and the balls F rotate in the channel above mentioned between the rings E and collars G G'. The collars are of hardened metal, similar to the rings, and the inner collars rotate with the bushing A, while the outer collars G' are attached, respectively, to the nut H and the adjustable collar J.

Surrounding the rollers and rings is a hardened sleeve L, against the inside of which the rollers and balls F bear. This sleeve is rigidly attached to the interior of the bushing A, and consequently rotates with it. At one end of the hub is a nut H, engaging with the extremity of the axle B and serving to hold the bearing in operative position.

The axle B is provided at suitable distances from its extremities with an adjustable collar J for taking up slack motion and wear in the moving parts.

At either extremity of the hub are dust-caps K, the one covering the nut H being solid, while the other—namely, the one covering the adjustable collar—is provided with a central circular opening, through which the axle passes. This dust-cup is further provided with a dust-brush K' of suitable material, preferably felt, in the form of an annular ring rigidly attached to the dust-cap and bearing against the adjustable collar, as shown. A plain washer filling the space between the dust-cap and the adjustable collar may be used, if desired.

The bushing A is designed to be made in two similar parts, as shown in the drawing. These parts telescope into one another and are further fastened together by rivets M passing through the flanges. In a vehicle-wheel designed for light use the spokes of the wheel are inserted between the flanges of the bushing and secured by the rivets. In a heavier wheel having a large wooden hub the spokes will not touch the bushing A, but will be secured to the wooden exterior hub in the usual manner, the rivets only serving to hold the sections of the bushing together.

My device may also be applied to bearings for line-shafting, motors, rotary fans, and similar machines, as well as all classes of vehicles.

Having thus described my invention, so that the same may be readily understood by those skilled in the art to which it appertains, what I claim, and desire to secure by Letters Patent, is—

In a bearing, a plurality of rollers having concave pockets in their ends, rings adjacent to the ends of the rollers, said rings being L-shaped in cross-section and having concave pockets in their inner faces oppositely disposed to the pockets in the rollers and annular channels in their outer faces, a series of balls bearing in said pockets, a second series of balls disposed in said annular channels, said second series of balls having a larger diameter than the depth of the channels in either direction, collars adapted to contact with the second series of balls, an adjusting-collar located at the end of the bearing and a dust-cap covering said adjusting-collar, said dust-cap carrying a dust-brush adapted to bear against the adjustable collar.

In witness whereof I have hereunto set my hand in the presence of two witnesses.

WILLIAM HENDERSON RUSSELL.

Witnesses:
 A. A. AITKEN,
 R. T. D. AITKEN.